United States Patent [19]

Pratt

[11] Patent Number: 4,917,215

[45] Date of Patent: Apr. 17, 1990

[54] SPACE STATION TRANSPORT SYSTEM FOR EXTRAVEHICULAR ACTIVITY

[75] Inventor: Raymond L. Pratt, Sterling, Va.

[73] Assignee: Grumman Aerospace Corporation, Bethpage, N.Y.

[21] Appl. No.: 235,076

[22] Filed: Aug. 23, 1988

[51] Int. Cl.⁴ .................. B61B 13/04; A62B 35/00
[52] U.S. Cl. ........................... 182/3; 182/13; 182/36; 104/118
[58] Field of Search .............. 182/13, 12, 36, 134, 182/135, 3; 104/118

[56] References Cited

U.S. PATENT DOCUMENTS

| | | |
|---|---|---|
| 1,519,748 | 12/1924 | Aguilar . |
| 1,918,293 | 7/1933 | Seiler . |
| 2,330,288 | 9/1943 | Hurley ............................ 182/134 |
| 3,200,904 | 8/1965 | Weeks . |
| 3,348,632 | 10/1967 | Swager . |
| 3,612,465 | 10/1971 | Barrett . |
| 3,703,218 | 11/1972 | Brda ............................... 182/193 |
| 3,968,858 | 7/1976 | Vollan et al. . |
| 3,985,082 | 10/1976 | Barac . |
| 4,085,818 | 4/1978 | Swager . |
| 4,168,765 | 9/1979 | Ferguson et al. . |
| 4,271,762 | 6/1981 | Wiegand . |
| 4,301,891 | 11/1981 | Harbian . |
| 4,310,070 | 1/1982 | Mastrogiannis . |
| 4,368,801 | 1/1983 | Lewis . |
| 4,427,092 | 1/1984 | Tentler . |
| 4,572,329 | 2/1986 | Kleveborn . |
| 4,606,430 | 8/1986 | Roby ................................ 182/36 |
| 4,721,182 | 1/1988 | Brinkmann ........................ 182/36 |

*Primary Examiner*—Reinaldo P. Machado
*Attorney, Agent, or Firm*—Pollock, VandeSande & Priddy

[57] ABSTRACT

A rail transport system is secured to a space station and provides a path for astronaut travel. Releasable bindings are journalled to a rail so that an astronaut can quickly travel from one point to another and release the binding so he is free to move at the arrived point. The rails may be configured in a continuous path so that a minimum of binding disconnections is possible. Oppositely facing binding means are also provided so that the astronaut may travel bi-directionally along the rail.

9 Claims, 2 Drawing Sheets

SPACE STATION TRANSPORT SYSTEM FOR EXTRAVEHICULAR ACTIVITY

FIELD OF THE INVENTION

The present invention relates to people-moving devices, and more particularly to a system for transporting astronauts about a structural member of a space station.

BACKGROUND OF THE INVENTION

As space stations become a reality, means must be found for transporting an astronaut from one point to another along the exterior of the station so that extravehicular tasks may be performed, such as maintenance and repair.

In the past, a number of techniques has been proposed for transporting crew and equipment along various points of a space station with safety and speed. A common concept is to employ a hand rail about the space station structure to permit an astronaut to "climb" along the rail in a hand-over-hand manner. Since an astronaut is encumbered by a space suit and since stability is decreased in a sharply reduced gravitational field, hand-over-hand translation is relatively slow and tedious. A tether between the rail and the astronaut is essential in order to ensure the astronaut's safety in the event of a misstep.

Certain prior art approaches require the tether to be connected and disconnected each time the supporting hand rail reaches an intersection with differently directed rails. Of course, this slows down the astronaut's travel and decreases productivity.

BRIEF DESCRIPTION OF THE INVENTION

The present invention is directed to an improvement of crew and equipment-transporting means for a space station environment. In its most basic form, the present invention includes a step-in boot binding which is journaled to the rail and allows the astronaut to propel himself along the rail after gaining an initial velocity by pulling on the rail. A hand brake for the journaled restraint is provided so that the propelling velocity may be decreased thereby allowing an astronaut to slow his travel along the rail and stop at a preselected point where extra vehicular activity is to be performed.

The present invention envisions the utilization of a continuous rail, as much as possible, about the space station where the astronauts are to travel. This approach decreases the number of step-in and step-out connections the astronaut must make with the binding.

In a further embellishment of the present invention, the foot restraint is part of a sliding sled, which is also journaled to the rail, the sled permitting equipment and tools to be transported along with the astronaut.

As a result of the present invention, rapid crew and equipment movement is possible which enhances productivity and safety of the crew.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
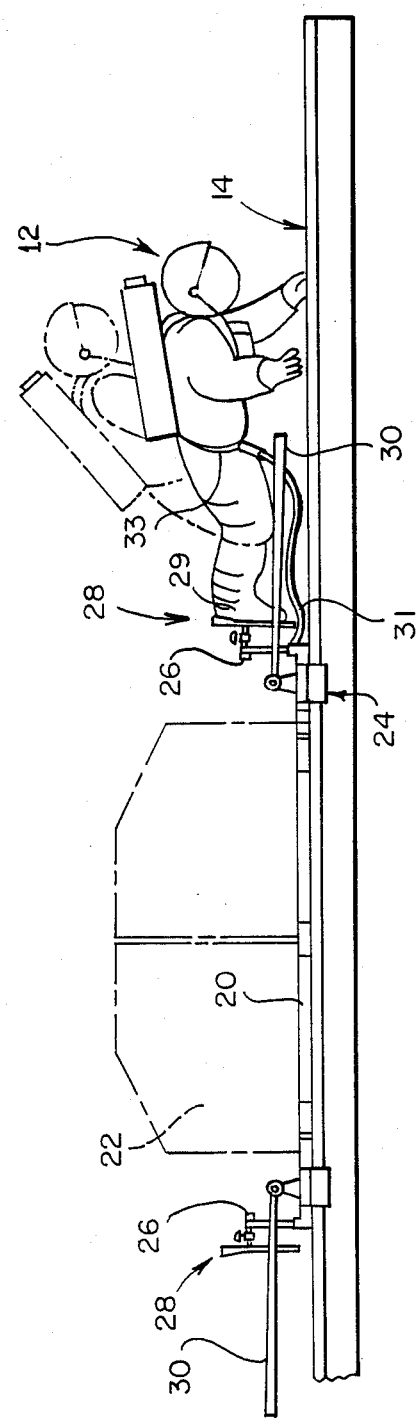
FIG. 1 is a schematic illustration of the proposed astronaut transport system.

FIG. 1 is a schematic illustration of the present invention wherein an astronaut transport system includes a releasable boot binding 28 which secures the boots 29 of an astronaut 12. The binding has a journal block 24 attached thereto for sliding along a single or double rail 14.

Figure 2:
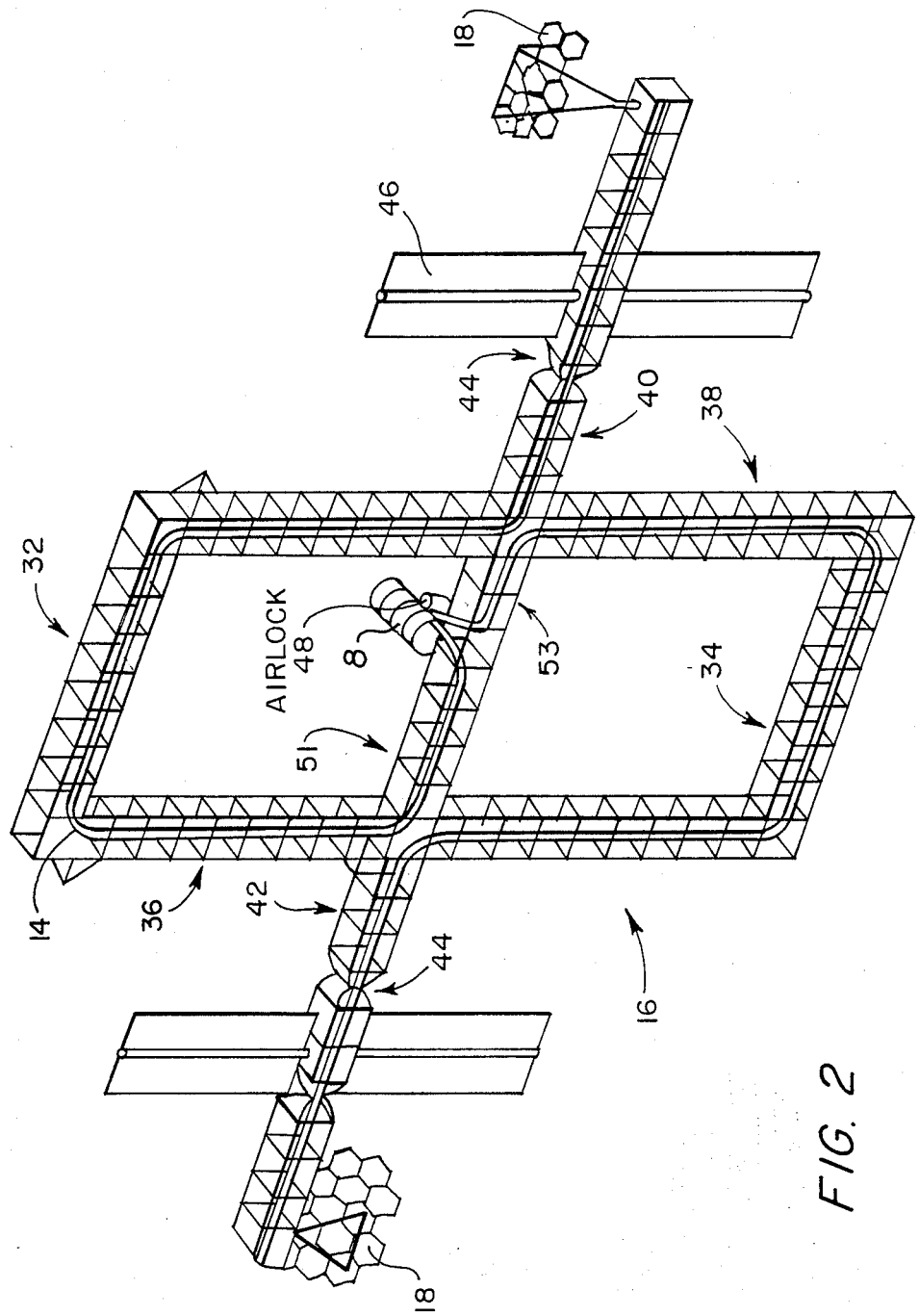
FIG. 2 is a schematic illustration of a rail installation on a space station.

FIG. 2 schematically illustrates a truss structure 16 attached to a pressurized module 8 and supporting a generally continuous rail 14 which loops by critical points where an astronaut is expected to perform extravehicular activities.

Referring once again to FIG. 1, the astronaut transport system may be embellished with a sled 20 which likewise is journaled to the rail 14 and is integrally connected to the binding 28 so that the sled and the astronaut may travel together. This permits the astronaut to carry equipment and tools on the sled in containers such as indicated by a double equipment rack 22.

A journal block 24 supports both the sled 20 and boot binding 28 so that smooth translational motion of the sled and the astronaut may be accomplished. The binding 28 may be similar to a ski binding and for purposes of flexibility is preferably mounted to a swivel or pivot joint 26, the latter being interposed between the binding and the journal block 24. A single joint 26 may be connected to two relatively stationary boot bindings or two such joints may be offered to respectively accommodate separate boot bindings. Of course, the binding must permit relatively easy insertion and removal of an astronaut's boot. In order to control the speed of transport, a hand brake 30 may be provided for frictionally contacting the rail 14 to adjustably slow down the astronaut as he wishes or to stop him at a particular point along the rail 14. As a safety precaution, a tether 31 is connected between a safety belt 33 around the astronaut's midsection and a fixed point on the sled 20.

In order to minimize the travel time for an astronaut, the binding construction can be repeated on the opposite end of the sled 20. This allows the astronaut to disconnect himself from one end and connect himself to the other end so that he can travel bi-directionally.

With further consideration of FIG. 1, the astronaut is shown in a solid line prone position with the hand brake 30 in easy reach. If he wishes, the astronaut can travel in a crouched position, as indicated by dotted lines. This affords the astronaut greater forward visibility as he travels. As the astronaut approaches a work point, he gradually brakes until he reaches the point where he wishes to stop and perform extravehicular activities. The astronaut is now free to remain restrained within the binding or release himself from the binding, which allows him free movement restrained only by the tether.

FIG. 2 illustrates a typical extravehicular activity truss structure for supporting the rail routes along which an astronaut may travel. Such a structure includes upper and lower horizontal booms 32 and 34 interconnected with vertical keel sections 36 and 38 to complete a rectangular outline. A right transverse boom 40 and a left transverse boom 42 are co-linear and bisect median points of the keel sections 36 and 38. The transverse booms include rotary joints 44 so that members such as solar panels 46 or solar concentrators 18 may be mounted for rotation about the boom axis. The rail 14 runs along the truss structure shown in FIG. 2, along the various boom and keel sections. By incorporating a continuous loop along the truss, an astronaut can travel from an outward point to the centrally located airlock 48 by a path which, for example, includes: transverse boom section 40, keel section 38, upper boom 32, keel section 36, and the inward boom section 51 terminating at air lock 48. Of course, if an astronaut were to traverse either rotary joint 44, momentary disconnection of the binding would be necessary until the joint was traversed.

Similar travel can be made from the transverse boom 42 to the air lock 48 via lower keel section 36, horizontal boom 34, lower keel section 38 and inner transverse boom section 53 which terminates in the air lock 48 also.

As will be appreciated from an understanding of the present invention, the disclosed astronaut transport system offers rapid space crew and equipment movement which enhances productivity in extravehicular activities.

It should be understood that the invention is not limited to the exact details of construction shown and described herein for obvious modifications will occur to persons skilled in the art.

I claim:

1. A personnel transport system comprising:
   an extended rail;
   journal means slidably mounted to the rail;
   boot binding means connected to the journal means for releasably securing a person's boot thereby enabling the person to slide along the rail;
   braking means located in proximity to the binding means for frictionally engaging the rail to permit speed control of a transported person; and
   a sled connected to the journal means and the binding means for carrying a load along the rail.

2. The structure set forth in claim 1 together with second binding means connected to the sled and facing an opposite direction from the first-mentioned binding means thereby permitting bi-directional transport of the person along the rail.

3. The structure set forth in claim 2 together with second braking means located in proximity to the second binding means.

4. A space station transport system comprising:
   at least one continuous curved length of rail secured to a space station structure;
   journal means slidably mounted to the rail;
   boot binding means connected to the journal means for releasably securing an astronaut's boot, thereby enabling his sliding movement along the rail; and
   braking means located in proximity to the binding means for frictionally engaging the rail to permit speed control of a moving astronaut.

5. The structure forth in claim 4 together with a sled connected to the journal means and the binding means for carrying a load along the rail with the astronaut.

6. The structure set forth in claim 4 together with means for rotationally mounting the binding means relative to the rail.

7. The structure set forth in claim 4 together with tether means for securing the astronaut to the binding means.

8. The structure set forth in claim 5 together with second binding means connected to the sled and facing an opposite direction from the first-mentioned binding means thereby permitting bi-directional transport of the person along the rail.

9. The structure set forth in claim 8 together with second braking means located in proximity to the second binding means.

* * * * *